United States Patent
Lee

(10) Patent No.: US 12,371,096 B2
(45) Date of Patent: Jul. 29, 2025

(54) STEERING CONTROL DEVICE AND METHOD

(71) Applicant: HL MANDO CORPORATION, Pyeongtaek-si (KR)

(72) Inventor: Kwang Hyung Lee, Gwangju-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 176 days.

(21) Appl. No.: 18/127,813

(22) Filed: Mar. 29, 2023

(65) Prior Publication Data

US 2023/0311977 A1 Oct. 5, 2023

(30) Foreign Application Priority Data

Mar. 30, 2022 (KR) .......................... 10-2022-0039805

(51) Int. Cl.
*B62D 5/04* (2006.01)

(52) U.S. Cl.
CPC .................................... *B62D 5/046* (2013.01)

(58) Field of Classification Search
CPC .... B62D 5/046; B62D 5/0481; B62D 5/0493; B62D 5/0484; B62D 5/003; B60Y 2306/13

See application file for complete search history.

(56) References Cited

U.S. PATENT DOCUMENTS

| | | | |
|---|---|---|---|
| 5,504,679 A * | 4/1996 | Wada ................... | B62D 5/0493 701/41 |
| 8,051,945 B2 * | 11/2011 | Collier-Hallman .... | B62D 5/046 180/443 |
| 2019/0188405 A1 * | 6/2019 | Sanchez ................ | H04L 63/083 |
| 2019/0375447 A1 * | 12/2019 | Zuzelski ................. | B62D 1/00 |
| 2021/0124655 A1 * | 4/2021 | Birnie .................. | G06F 11/1471 |

FOREIGN PATENT DOCUMENTS

| | | | | |
|---|---|---|---|---|
| CN | 112238894 A | * | 1/2021 | ........... B62D 5/0463 |
| DE | 10 2016 205 109 A1 | | 10/2017 | |
| WO | WO-2022032498 A1 | * | 2/2022 | |

OTHER PUBLICATIONS

Office Action dated Mar. 31, 2025 for corresponding Korean Patent Application No. 10-2022-0039805, along with an English machine translation (8 pages).

* cited by examiner

*Primary Examiner* — Joseph J Dallo
(74) *Attorney, Agent, or Firm* — Hauptman Ham, LLP

(57) ABSTRACT

The embodiment relates to a steering control device. Specifically, a steering control device comprises a micro controller unit (MCU) receiving data from a sensor, processing the data to produce a first processing result, and outputting a first control signal for steering a vehicle to an actuator based on the first processing result and a hardware logic gate receiving data from the sensor, processing the data to produce a second processing result, and outputting a second control signal for determining whether to operate the actuator to the actuator based on the second processing result.

14 Claims, 7 Drawing Sheets

STEERING CONTROL DEVICE AND METHOD

CROSS-REFERENCE TO RELATED APPLICATION

This application claims priority from Korean Patent Application No. 10-2022-0039805, filed on Mar. 30, 2022, which is hereby incorporated by reference for all purposes as if fully set forth herein.

BACKGROUND

Field

The present embodiments relate to a steering control device and method.

DESCRIPTION OF RELATED ART

Nowadays, the development of vehicle safety control systems are rapidly growing according to the demand of consumers. Such a vehicle safety system is applied to various fields, such as steering, braking, and suspension, and has recently been implemented in various ways using electronic components.

In particular, in steering assist systems that assist steering of vehicles, as compared with conventional systems using a single controller for controlling the vehicle, redundant system-applied steering assist systems adopting two or more controllers to control vehicle steering appear. A redundant system is equipped with two or more controllers to, when one controller fails, perform steering control with the other controller, providing high driving stability or to simultaneously distribute power to the two controllers to perform steering control, thereby providing high driving stability.

However, the redundant system may include two micro controller units (MCUs), which are in charge of computation of the electronic control unit (ECU) and have the same structure. In this case, if a common cause failure occurs, neither the MCUs may properly work.

To address the common cause failure, two heterogeneous MCUs having different structures are needed. However, development of heterogeneous systems and cooperative control between the heterogeneous systems consume huge costs and resources.

Thus, a need arises for development of a technique capable of significantly reduce the possibility of a common cause failure in the software part while minimizing cost increase.

To achieve the foregoing objectives, in an aspect, the disclosure provides a steering control device comprising a micro controller unit (MCU) receiving data from a sensor, processing the data to produce a first processing result, and outputting a first control signal for steering a vehicle to an actuator based on the first processing result and a hardware logic gate receiving data from the sensor, processing the data to produce a second processing result, and outputting a second control signal for determining whether to operate the actuator to the actuator based on the second processing result.

In another aspect, the disclosure provides a steering control method comprising a data processing step in which each of a micro controller unit (MCU) and a hardware logic gate receives data from a sensor and processes the data to produce a first processing result and a second processing result, respectively, and a control signal output step in which the MCU outputs a control signal for steering a vehicle to an actuator based on the first processing result, and the hardware logic gate outputs a second control signal for determining whether to operate the actuator to the actuator based on the second processing result.

According to the disclosure, the steering control device and method may significantly reduce the possibility of a common cause failure in the software part while minimizing cost increase.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
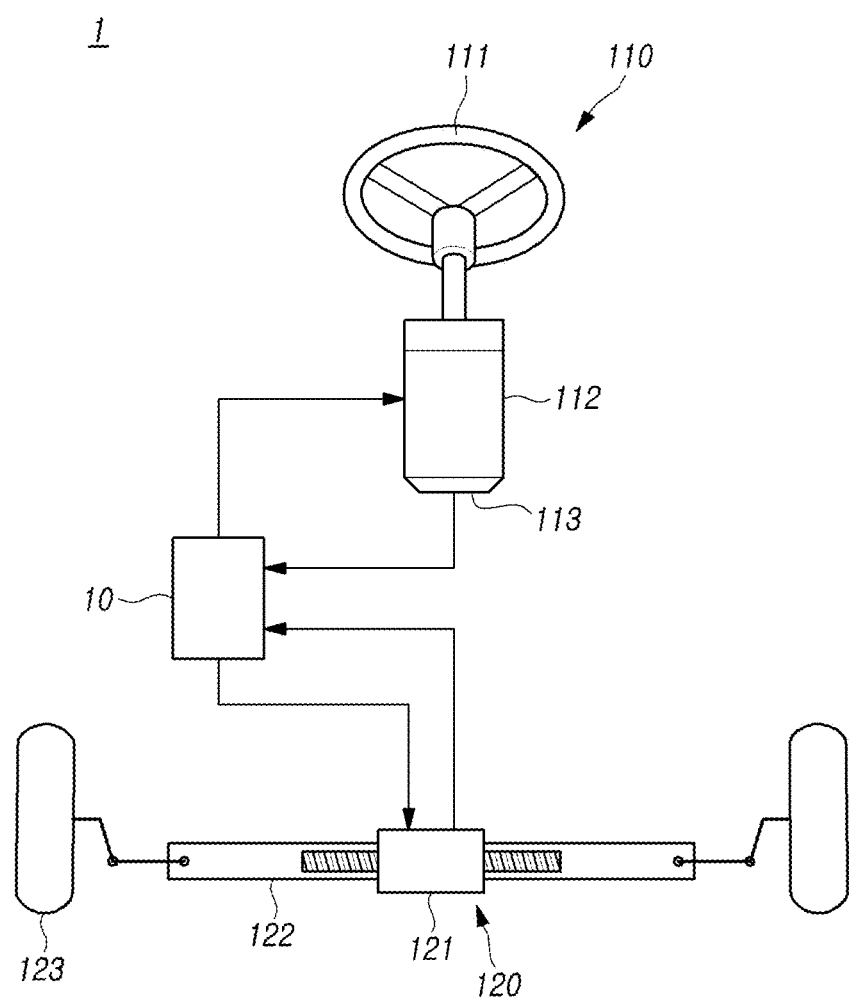
FIG. 1 is a view schematically illustrating a steering control system according to an embodiment.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, an embodiment of a steering control system 1 that may perform the function of a steering control device 10 and the function of controlling the steering of the vehicle is described.

FIG. 1 is a view schematically illustrating a steering control system 1 according to an embodiment.

Referring to FIG. 1, the steering control system 1 according to an embodiment may mean a system that controls the steering of the vehicle equipped with the steering control system 1 according to the rotation angle of the steering wheel 111 manipulated by the driver.

The steering control system 1 may include hydraulic power steering (HPS), which generates hydraulic pressure by rotating a pump to provide steering assist force, and electronic power steering (EPS), which drives a motor to provide steering assist force, depending on driving types. The following description focuses primarily on the electronic steering control system 1, but the disclosure is not limited thereto.

The electronic power steering control system 1 may be a mechanical steering control system 1, which steers the wheel 123 by transferring the force (torque) generated by the driver turning the steering wheel 111 to the steering motor 121 via a mechanical power transmission device (e.g., linkage) to steer the wheel 223 by the driving of the steering motor 121, or a steer-by-wire (SbW) system, which transfers power by transmitting/receiving electric signals through, e.g., a cable, instead of a mechanical power transmission device, depending on whether the steering input actuator 110 and the steering output actuator 120 is coupled through a mechanical connecting member (or linkage). An example in which the steering control system 1 is an SbW system is described below, but the disclosure is not limited thereto.

The steering control system 1 according to the disclosure, as shown in FIG. 1, may include a steering input actuator 110, a steering control device 10, and a steering output actuator 120. As described above, if the steering control system 1 is an SbW system, the steering input actuator 110 and the steering output actuator 120 may be mechanically separated from each other.

The steering input actuator 110 may mean a device to which steering information intended by the driver is inputted. As described above, the steering input actuator 110 may include a steering wheel 111, a steering shaft 112, and a reaction force motor 113. Although not shown in FIG. 1, the steering angle information may further include a steering gear for transferring the rotational force of the reaction force motor 113 to the steering shaft 112.

The reaction force motor 113 may receive a control signal (or referred to as a 'command current') from the steering controller 10 and apply a reaction force to the steering wheel 111. Specifically, the reaction force motor 113 may receive a command current from the steering control device 10, drive at a rotation speed indicated by the command current to generate reaction torque, and transfer the generated reaction torque to the steering wheel 111 through the steering gear.

The steering control device 10 may receive steering information from the steering input actuator 110, calculate a control value, and output an electrical signal indicating the control value to the steering output actuator 120. The steering information may mean information including at least one of a steering angle or driver's torque.

Meanwhile, the steering control device 10 may receive, as feedback, power information actually output from the steering output actuator 120, calculate a control value, and output an electrical signal indicating the control value to the steering input actuator 110 to provide reaction force, providing the driver with a steering sensation (steering feeling).

The steering output actuator 120 may mean a device that actually drives the steering of the vehicle. The steering output actuator 120 may include a steering motor 121, a rack 122, a wheel 123, a vehicle velocity sensor, and a rack position sensor.

The steering input actuator 110 and the steering output actuator 120 each may further include a motor torque sensor capable of detecting the motor torque of the reaction force motor 113 and the steering motor 121.

The steering motor 121 may axially move the rack 122. Specifically, the steering motor 121 may receive a command current from the steering controller 10 and thus drive, and may allow the rack 122 to linearly move in the axial direction.

As driven by the steering motor 121, the rack 122 may perform a linear motion which allows the wheels 123 to turn to the left or right.

Although not shown, the steering control system 1 according to the disclosure may further include, e.g., a clutch for separating or connecting the steering input actuator 110 and the steering output actuator 120. The clutch may be operated by the control of the steering control device 10.

If the steering control system 1 according to the disclosure is an SbW system, and the vehicle travels in an autonomous vehicle mode, the steering control system 1 according to the disclosure may control only the steering output actuator 120 to perform steering control on the vehicle or may control both the steering input actuator 110 and the steering output actuator 120 to perform steering control on the vehicle.

According to an embodiment of the disclosure, the steering control device 10 may be an advance driver assistance system (ADAS) that provides information helpful for driving the host vehicle or assists the driver in the host vehicle.

Here, ADAS may refer to various types of advanced driver assistance systems and may include, e.g., autonomous emergency braking, smart parking assistance system (SPAS), blind spot detection (BSD), adaptive cruise control (ACC), lane departure warning system (LDWS), lane keeping assist system (LKAS), and lane change assist system (LCAS). However, without limitations thereto, any system capable of assisting the driver in driving may be included.

Figure 2:
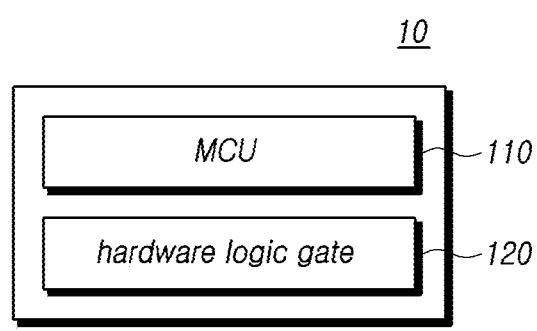
FIG. 2 is a block diagram schematically illustrating a steering control device according to an embodiment of the disclosure.

FIG. 2 is a block diagram schematically illustrating a steering control device 10 according to an embodiment of the disclosure.

Referring to FIG. 2, a steering control device 10 may include a micro controller unit (MCU) 110 and a hardware logic gate 120.

The steering control device 10 may receive data from a sensor and process the data to produce a first processing result and a second processing result and output a first control signal for steering the vehicle based on the first processing result and a second control signal for determining whether to operate the actuator based on the second processing result.

Specifically, the MCU 110 included in the steering control device 10 may receive data from the sensor, process the data to produce a first processing result, and output a first control signal for steering the vehicle to the actuator based on the first processing result.

Here, the sensor may be a motor torque sensor, a vehicle velocity sensor, a rack position sensor, or a steering angle sensor included in the steering input actuator 110 and the steering output actuator 120. However, without limitations thereto, other sensors used for vehicle steering assistance may further be included. The data sensed by the sensors may be analog and digital data detected by each sensor and stored.

The actuator may mean a steering input actuator or a steering output actuator. The first control signal may be output to either the steering input actuator or the steering output actuator according to driving conditions, but is not limited thereto. The first control signal may be output to each of the steering input actuator and the steering output actuator according to driving conditions.

For example, if the driver controls the steering wheel 111, the MCU 110 in the SbW system may receive information, such as steering angular velocity and steering angle and output a first control signal to the steering output actuator 120 to allow the rack to move to the rack position corresponding thereto, and output a first control signal to the steering input actuator 110 to provide a reaction force to the steering wheel 111.

The first processing result may be produced based on the data received from the sensor, and the first control signal may mean a signal for steering the vehicle based on the first processing result.

The first processing result may mean a data processing result for determining the possibility of collision with another vehicle based on, e.g., steering angle data, steering angular velocity data, and velocity data, and the first control signal may mean a signal for steering the vehicle to avoid collision with the host vehicle based on the first processing result at which the possibility of collision has been determined, e.g., a signal for controlling, e.g., the operation direction and velocity of the actuator. However, without limitations thereto, the first processing result may mean any result for vehicle steering, processed based on the data received from the sensor, and the first control signal may mean any signal for vehicle steering. The hardware logic gate 120 may receive data from the sensor and process the data to process the second processing result, and output a second control signal for determining the operation of the actuator based on the second processing result to the actuator.

The second control signal may be output to each or both of the steering input actuator 110 and the steering output actuator 120. The second processing result may be produced based on the data received from the sensor, and the second control signal may mean a signal for determining whether to operate the actuator based on the second processing result.

The second processing result may be the same as the first processing result. For example, when the first processing result is a data processing result for determining the possibility of collision with another vehicle, and the second processing result may also be a data processing result for determining the possibility of collision with another vehicle. In other words, the same data processing result may be produced from each of the MCU 110 and the hardware logic gate 120.

The second control signal may be a signal for determining whether to operate the actuator based on the second processing result and may be an enable signal or a disable signal. Accordingly, if actuator operation according to the second processing result is not necessary although the first control signal for actuator operation is output from the MCU 110, the hardware logic gate 120 may output a disable signal to disable the actuator.

Although FIG. 2 shows that the steering control device 10 has one MCU 110 for convenience of description, if a redundant system is configured, the steering control device 10 may further include a first electronic control unit (ECU) including an MCU 110 and a hardware logic gate 120 and a second ECU having the same configuration.

As described above, the steering control device 10 according to the disclosure may produce the same data from the sensor, from each of the MCU 110 and the hardware logic gate 120 and determine whether it is needed to operate the actuator based on the second processing result which is the data processing result of the hardware logic gate 120 although the first control signal for controlling the actuator is output from the MCU 110, enhancing the operation stability of the steering control device 10.

Figure 3:
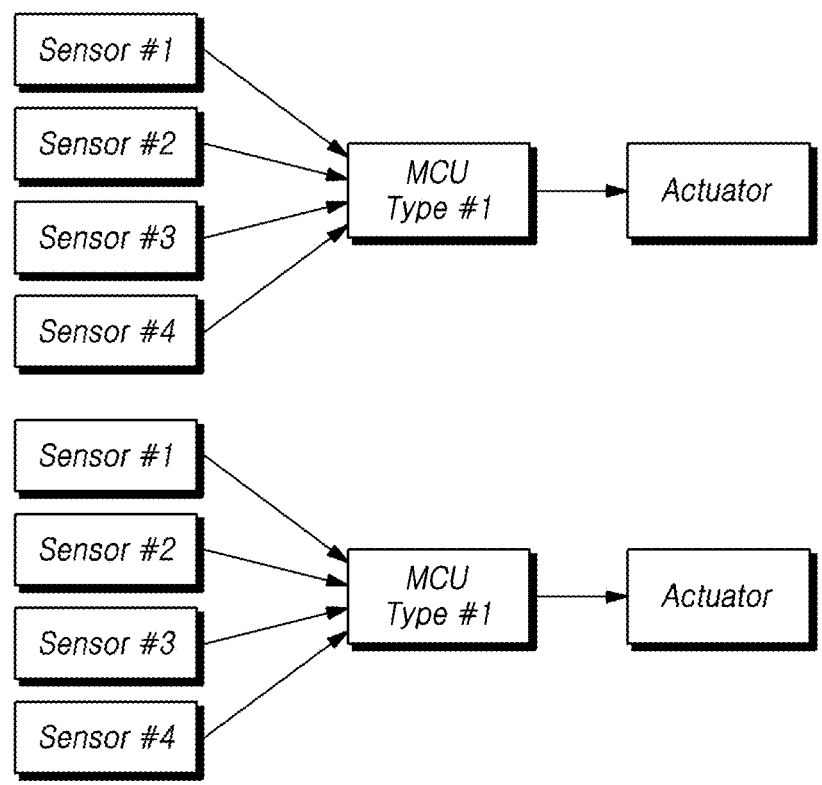
FIG. 3 is a view illustrating a structure of a conventional redundant system according to an embodiment.

FIG. 3 is a view illustrating a structure of a conventional redundant system according to an embodiment.

Referring to FIG. 3, the conventional redundant system includes two MCUs 110 having the same structure, so that when one MCU fails while performing vehicle steering control, the MCU on standby receives the control right from the failed MCU 110 to perform vehicle steering control.

In this case, only when one MCU physically fails (e.g., short-circuited or open-circuited) or failure is limited only to one MCU, the standby MCU may replace its role.

However, when a common cause failure occurs in both the MCUs, the standby MCU, which has the same system or same structure (Type #1), may not be freed from the issue despite the role replacement.

Further, the more complicated core components constituting the same system are, the higher likely a common cause failure may be.

Figure 4:
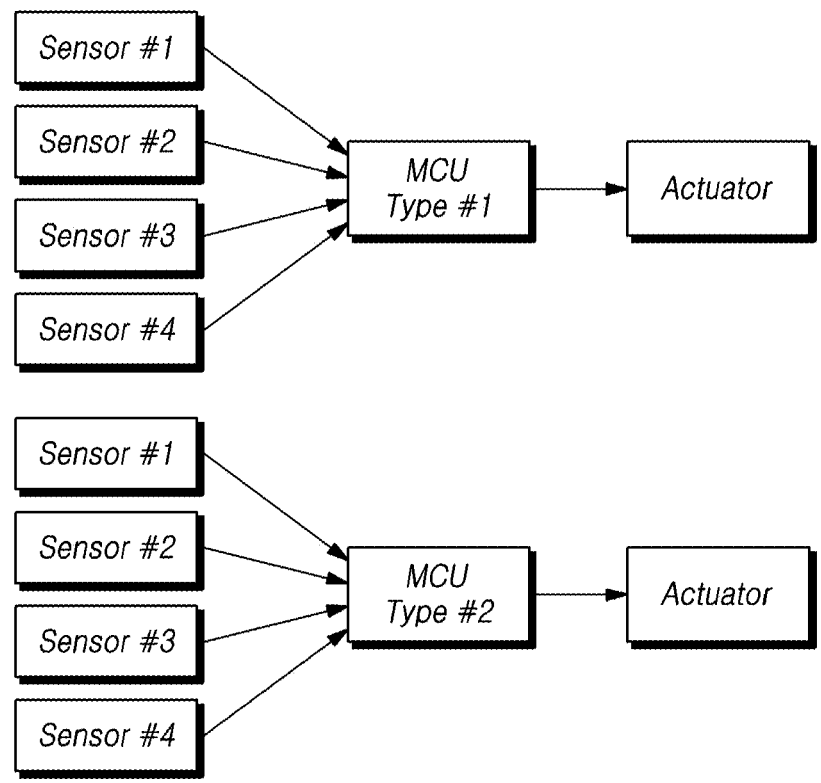
FIG. 4 is a view illustrating an ideal redundant system according to an embodiment.

FIG. 4 is a view illustrating an ideal redundant system according to an embodiment.

Referring to FIG. 4, to complement the above-described conventional redundant system, the MCUs 110 processing data need to be constituted of different systems or different structures (Type #1 and Type #2).

In such a case, since the two MCUs have different systems or different structures, the possibility of a common cause failure may reduce.

However, different kinds of MCUs may consume huge costs and resources due to development of heterogeneous systems and cooperative control between heterogeneous systems.

In light of this background, the disclosure may implement redundancy and heterodyning of MCUs 110 by use of the hardware logic gate 120 although having the same type of MCUs 110-1 and 110-2 in configuring a redundant system.

Figure 5:
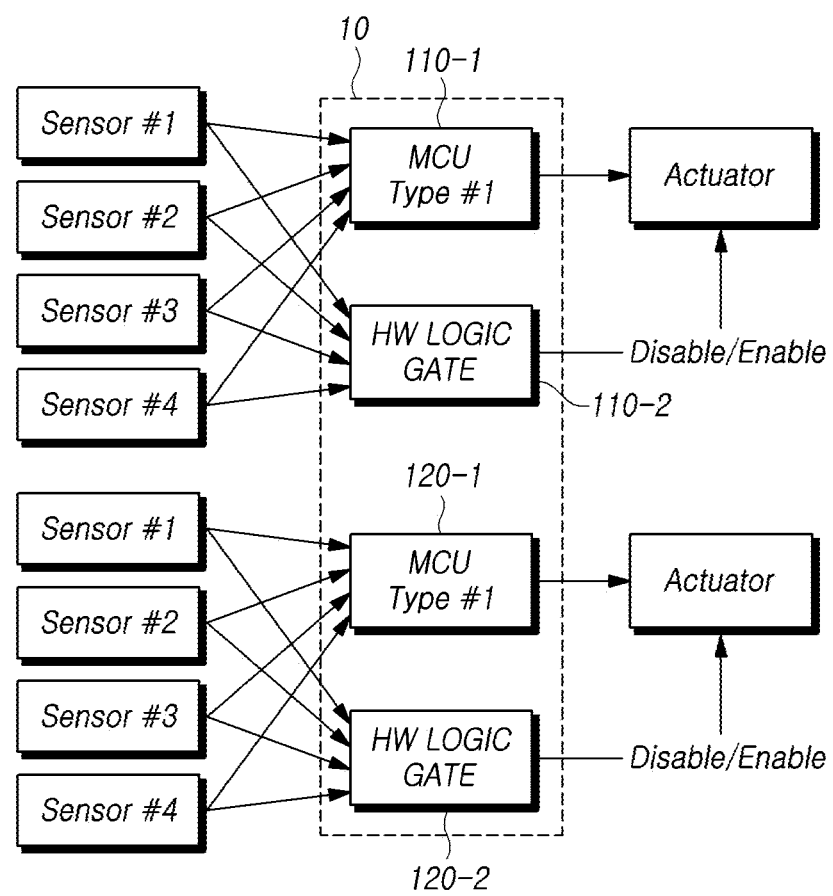
FIG. 5 is a view illustrating a redundant system using a steering control device according to an embodiment of the disclosure.

FIG. 5 is a view illustrating a redundant system using a steering control device 10 according to an embodiment of the disclosure.

Referring to FIG. 5, the steering control device 10 may include two MCUs 110-1 and 110-2 of the same type (Type #1) and two hardware logic gates 120-1 and 120-2 capable of receiving and processing the same data as that of the respective MCUs 110-1 and 110-2.

These hardware logic gates 120-1 and 120-2 may be composed of programmable logic circuits. For example, the hardware logic gates 120-1 and 120-2 may include at least one of a field programmable gate array (FPGA), a complex programmable logic device (CPLD), and a generic array logic (GAL).

Since the hardware logic gates 120-1 and 120-2 are composed of simple hardware logic, such as AND, OR, and NOT, the possibility of error is remarkably low compared to relatively complex software operations.

Accordingly, in a normal case, the MCU 110-1 and the hardware logic gate 120-1 each process data, and the MCU 110-1 controls steering of the vehicle based on the first processing result. The hardware logic gate 120-1 may determine whether to operate the actuator based on the second processing result.

In an abnormal case, e.g., as an abnormality occurs in the first processing result, a first control signal for controlling vehicle steering is output even when vehicle steering control is not necessary. If the cause is attributed to a common cause failure, the same result is produced although the standby MCU 110-2 in the redundant system receives the control right, putting the driver in danger.

However, the hardware logic gate 120-1 which independently processes the same data may output a second control signal that disables the operation of the actuator although the first control signal is output when actuator operation is not necessary based on the second processing result.

In other words, the hardware logic gate 120-1 may output the second control signal for disabling the operation of the actuator when actuator operation is not necessary in the second processing result.

Since the hardware logic gates 120-1 and 120-2 are constituted of simple hardware logic as described above, although the MCUs 110-1 and 110-2 fail, the hardware logic gates 120-1 and 120-2 may be highly likely not to fail.

Here, disabling the actuator is not limited to a specific operation as long as it enables the vehicle to avoid danger. For example, if the vehicle is able to avoid danger simply by disabling the steering motor 121 or reaction force motor 113 without the need for disabling all of the devices included in the actuator, the hardware logic gates 120-1 and 120-2 may not disable the sensor included in each actuator.

Accordingly, since the actuator is disabled by the second processing result, the driver may avoid danger.

Figure 6:
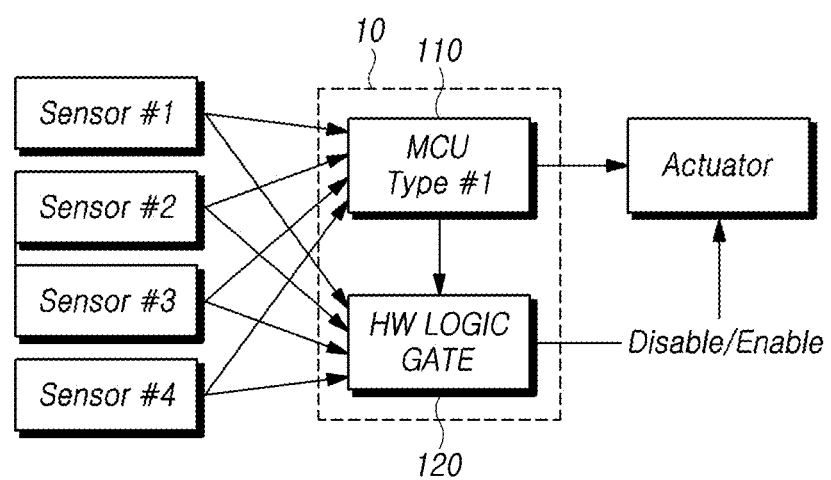
FIG. 6 is a view illustrating an example in which an MCU sends a trigger signal to a hardware logic gate according to an embodiment.

FIG. 6 is a view illustrating an example in which an MCU 110 sends a trigger signal to a hardware logic gate 120 according to an embodiment.

The hardware logic gate 120 may have a higher computation speed than the MCU 110 by virtue of including simple logic.

Accordingly, referring to FIG. 6, upon receiving a trigger signal from the MCU 110 to synchronize the output times of the first control signal and the second control signal, the hardware logic gate 120 may process data and produce the second processing result.

The trigger signal may be transmitted to the hardware logic gate 120 after the first processing result is produced.

Although the trigger signal is transmitted to the hardware logic gate 120 after the first processing result is produced from the MCU 110, to produce the second processing result, since the computation speed of the hardware logic gate 120 is higher than that of the MCU 110, the second control signal of the hardware logic gate 120 may be output simultaneously with or earlier than the first control signal of the MCU 110.

The trigger signal may include information about the first processing result produced from the MCU 110. The hardware logic gate 120 may receive the first processing result and compare the first processing result and the second processing result, outputting the second control signal.

The hardware logic gate 120 may produce the same computational result as the MCU 110 if previously programmed for a specific area. Further, since the hardware logic gate 120 may be constituted of, e.g., an FPGA, if programmed for a different area, it may produce the same computational result as that of the MCU 110 even for the corresponding area.

When the first processing result and the second processing result are the same, the hardware logic gate 120 may output the second control signal for operating the actuator. If the first processing result and the second processing result are the same, the hardware logic gate 120 may determine that the MCU 110 normally operates.

In contrast, if the first processing result and the second processing result are different from each other, the hardware logic gate 120 may output a second control signal for disabling the actuator. Likewise, when the first processing result and the second processing result are different from each other, the hardware logic gate 120 may determine that the MCU 110 fails.

According to an embodiment, a computer system (not shown), such as the MCU 110, may be implemented as an electronic control unit. The ECU may include at least one or more of one or more processors, a memory, a storage unit, a user interface input unit, or a user interface output unit which may communicate with one another via a bus. The computer system may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Described below is a steering control method using the above-described steering control device 10 of the disclosure.

Figure 7:
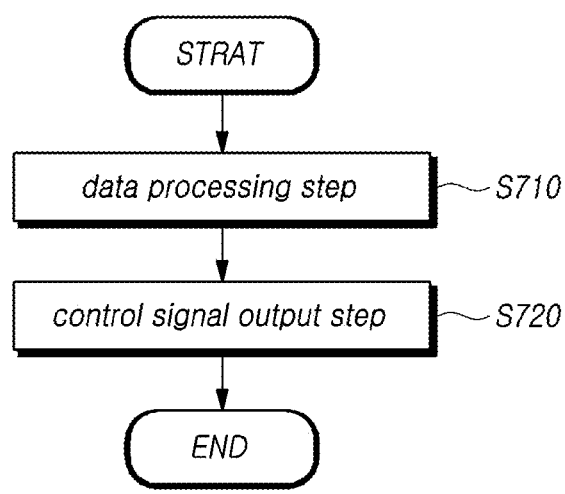
FIG. 7 is a flowchart illustrating a steering control method according to an embodiment of the disclosure.

FIG. 7 is a flowchart illustrating a steering control method according to an embodiment of the disclosure.

Referring to FIG. 7, according to an embodiment of the disclosure, a steering control method may comprise a data processing step S710 in which each of a micro controller unit (MCU) and a hardware logic gate receives data from a sensor and processes the data to produce a first processing result and a second processing result, respectively, and a control signal output step S720 in which the MCU outputs a control signal for steering a vehicle to an actuator based on the first processing result, and the hardware logic gate outputs a second control signal for determining whether to operate the actuator to the actuator based on the second processing result.

Here, the hardware logic gate 120 may include at least one of a field programmable gate array (FPGA), a complex programmable logic device (CPLD), and a generic array logic (GAL). The hardware logic gate 120 may be composed of simple hardware logic, such as AND, OR, and NOT, so that the probability of error may be reduced as compared to the MCU 110. The hardware logic gate 120 may be optimized by utilizing the Karnaugh map or Boolean algebra, and may selectively utilize the above-described GAL or CPLD or replacing it with a simple logic chip, saving costs.

The data processing step S710 may process data to produce a second processing result if the hardware logic gate 120 receives a trigger signal from the MCU 110. The trigger signal may be transmitted to the hardware logic gate 120 after the first processing result is produced. Further, the trigger signal may include information about the first processing result.

The control signal output step S720 may output the second control signal for disabling the operation of the actuator when actuator operation is not necessary, according to the second processing result.

In the control signal output step S720, the hardware logic gate 120 may receive the first processing result and compare the first processing result and the second processing result, outputting the second control signal.

The control signal output step S720 may output a second control signal for disabling the actuator if the first processing result and the second processing result are different from each other.

As described above, the steering control device and method according to the disclosure may significantly reduce the possibility of a common cause failure in the software part, minimize cost increase, and secure increased stability.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device, comprising:
   two micro controller units (MCUs) of the same type, each micro controller unit (MCU) receiving data from a sensor, processing the data to produce a first processing result, and outputting a first control signal for steering a vehicle to an actuator based on the first processing result;
   two hardware logic gates of the same type, each hardware logic gate receiving data from the sensor, processing the data to produce a second processing result, and outputting a second control signal for determining whether to operate the actuator to the actuator based on the second processing result; and
   an actuator including a motor and a sensor and driven to steer the vehicle based on at least one of the first control signal and the second control signal,
   wherein the second control signal is a signal for disabling the motor but not disabling the sensor if the vehicle is able to avoid danger simply by disabling the motor.

2. The steering control device of claim 1, wherein the hardware logic gate includes at least one of a field programmable gate array (FPGA), a complex programmable logic device (CPLD), or a generic array logic (GAL).

3. The steering control device of claim 1, wherein upon receiving a trigger signal from the MCU, the hardware logic gate processes the data to produce the second processing result.

4. The steering control device of claim 3, wherein the trigger signal is transmitted to the hardware logic gate after the first processing result is produced.

5. The steering control device of claim 1, wherein the hardware logic gate outputs the second control signal for disabling the actuator when the actuator need not be operated according to the second processing result.

6. The steering control device of claim 1, wherein the hardware logic gate receives the first processing result and compares the first processing result and the second processing result to output the second control signal.

7. The steering control device of claim 6, wherein the hardware logic gate outputs the second control signal for disabling the actuator if the first processing result differs from the second processing result.

8. A steering control method, comprising:
   a data processing step in which each micro controller unit (MCU) among two micro controller units (MCUs) of the same type and each hardware logic gate among two hardware logic gates of the same type receives data from a sensor and processes the data to produce a first processing result and a second processing result;
   a control signal output step in which the MCU outputs a first control signal for steering a vehicle to an actuator based on the first processing result, and the hardware logic gate outputs a second control signal for determining whether to operate the actuator to the actuator based on the second processing result; and
   an actuator driving step of driving an actuator which includes a motor and a sensor and is driven to steer the vehicle based on at least one of the first control signal and the second control signal,
   wherein the second control signal is a signal for disabling the motor but not disabling the sensor if the vehicle is able to avoid danger simply by disabling the motor.

9. The steering control method of claim 8, wherein the hardware logic gate includes at least one of a field programmable gate array (FPGA), a complex programmable logic device (CPLD), or a generic array logic (GAL).

10. The steering control method of claim 8, wherein in the data processing step, upon receiving a trigger signal from the MCU, the hardware logic gate processes the data to produce the second processing result.

11. The steering control method of claim 10, wherein the trigger signal is transmitted to the hardware logic gate after the first processing result is produced.

12. The steering control method of claim 8, wherein the control signal output step outputs the second control signal for disabling the actuator when the actuator need not be operated according to the second processing result.

13. The steering control method of claim 8, wherein in the control signal output step, the hardware logic gate receives the first processing result and compares the first processing result and the second processing result to output the second control signal.

14. The steering control method of claim 13, wherein the control signal output step outputs the second control signal for disabling the actuator if the first processing result differs from the second processing result.

* * * * *